United States Patent Office 3,218,683
Patented Nov. 23, 1965

3,218,683
FABRICATION OF EXOTHERMIC,
SELF-HARDENING MOLD
Takio Nishiyama, Ichikawa-shi, Chiba-ken, Tadao Nangoh, Katsushika-ku, Tokyo-to, and Kiyomi Sono, Adachi-ku, Tokyo-to, Japan, assignors to Kabushiki Kaisha Hitachi Seisakusho, Tokyo-to, Japan, a joint-stock company of Japan
No Drawing. Filed Aug. 24, 1962, Ser. No. 219,139
Claims priority, application Japan, Feb. 13, 1962, 37/4,827
3 Claims. (Cl. 22—193)

This invention relates to a new method of fabricating casting molds of the exothermic, self-hardening type. More specifically, the invention relates to a new method of forming such molds which comprises mixing silicon, a substance containing silicon (for example: calcium silicide or ferrosilicon), or a suitable silicon compound in powder form and water glass (for example: silicate of soda) which has been suitably diluted with water with a refractory material such as silica sand and immediately forming the mold. In another aspect, the invention also relates to a method of controlling the time for setting of the mold.

By the method of this invention, a chemical reaction takes place in the mold material, causing it to harden, immediately or in a short time depending on the concentrations and quantities of the water glass and silicon content and the temperature of the blended materials. At the same time, the reaction is accompanied by an exothermic phenomenon, whereby a drying effect is also obtained. Moreover, it is possible to pour molten metal immediately into the mold which has hardened, without the necessity of putting the mold through a drying process.

It has been found that, by the method of this invention, a mold of great strength can be made. Moreover, the magnitude of this strength can be freely controlled by regulating the quantities of the blended materials. Accordingly, a degree of strength and hardening time which are convenient for each mold can be selected.

It is well known that waterglass (aqueous solution of sodium silicate) partly hydrolyzes into caustic soda and silica sol. The chemical formula of sodium silicate can be represented generally by $Na_2O \cdot nSiO_2$.

Now, in order to explain the reaction of the present invention, a case of using meta-sodium-silicate is taken for example, wherein the value of $n$ is equal to 1.

$$Na_2O \cdot SiO_2 + H_2O \rightarrow NaOH + NaHSiO_3 \quad (1)$$

Further, $NaHSiO_3$ decomposes partly as follows:

$$NaHSiO_3 + H_2O \rightarrow NaOH + H_2SiO_3 \quad (2)$$

From the above, it can be seen that both $NaHSiO_3$ and $H_2SiO_3$ are present in the state of sol.

On the other hand, silicon reacts as follows in the presence of NaOH and water.

$$2NaOH + Si + H_2O = Na_2O \cdot SiO_2 + 2H_2 \quad (3)$$

Equations 1 and 2 are supported by "Water Glass (Its Properties, Production and Application)", p. 44, translated by S. Okuda, published by Corona-Sha, 1950; from the original German "Das Wasserglass" by Hermann Mayer.

For Equation 3 see "World Encyclopedia," vol. 9, 1956, pages 128 and 168; Heibonsha Publishing Co., Tokyo, Japan; also Textbook of Organic Chemistry, by A. F. Holleman, pages 259–260, John Wiley & Sons, New York, N.Y., 1916.

That is, by the above reaction, waterglass is produced once again together with generation of hydrogen. The reaction shown in the above Equation 3 is the exothermic reaction. When NaOH is consumed by the above-described reaction, the Equation 1 loses equilibrium and the reaction proceeds to the right side, whereby NaOH and $NaHSiO_3$ are produced. Also, the reaction in the Equations 1 and 2 proceeds to the right side. Thus, in repeating the foregoing reaction, $H_2SiO_3$ in a sol state is gradually increased.

As a result of this reaction, water is lost by decomposition and evaporation, the silicic acid component gels, the silicon oxidizes and becomes silicic acid, and silicate of soda is formed. Furthermore, the silicate of soda also loses its water content, and its viscosity gradually increases. These two effects cause the particles of the blended materials to be strongly bonded together. Moreover, water is lost by decomposition and the drying effect due to the heat of reaction as mentioned previously, and, after hardening, only a small quantity of bonding water remains.

On the other hand, since the silicon in the blended materials is oxidized and becomes silicic acid, the ratio $SiO_2/Na_2O$ in the bonded layers of sand grains increases as the reaction progresses. This effect serves to improve the high-temperature properties of the mold.

A so-called $CO_2$ gas method, which is recently widely practiced, comprises mixing silicate of soda with silica sand, blowing carbon dioxide gas into this mixture, and causing immediate hardening. Although this $CO_2$ gas method and the method of the present invention are similar in the use of silicate of soda and the causing of hardening through the gelation of silicic acid, the two methods are substantially different in that, in the $CO_2$ gas method, harmful carbonate of soda ($Na_2CO_3$) is generated, and, moreover, the original water content remains in the material, whereas, in the method of this invention, the residual product of reaction is silicate of soda, which means an increase in the silicic acid content, there being no harmful products, and the water content being given off. This difference, moreover, is a significant and advantageous feature of the present invention.

In order to indicate still more fully the nature of the present invention, the following examples are presented. In each example, the mixture materials indicated were mixed, and mold specimens were molded. The specimens thus molded were subjected to compression tests and gas permeability tests at different times after molding.

EXAMPLE 1

(1) *Mixture (parts by weight)*

|  | Parts |
|---|---|
| Silica sand (100 mesh, approx.) | 100 |
| Calcium silicide (200 minus mesh) | 2 |
| Silicate of soda (mol ratio 2; specific gravity 1.3) | 4.5 |

(2) *Test results*

| Elapsed time after molding to test (hour) | Compression strength (kg./cm.²) | Permeability (AFS) |
|---|---|---|
| 0.5 | 4.7 | 177 |
| 2 | 6.9 | 185 |
| 24 | 12.2 | 185 |

EXAMPLE 2

(1) *Mixture (parts by weight)*

|  | Parts |
|---|---|
| Silica sand (100 mesh, approx.) | 100 |
| Calcium silicide (200 minus mesh) | 4 |
| Silicate of soda (mol ratio 2; specific gravity 1.5) | 14 |

(2) *Test results*

| Elapsed time after molding to test (hour) | Compression strength (kg./cm.²) | Permeability (AFS) |
|---|---|---|
| 0.5 | 13 | 135 |
| 2 | 22 | 140 |
| 24 | 70 | 160 |

EXAMPLE 3

(1) *Mixture (parts by weight)*

|  | Parts |
|---|---|
| Silica sand (100 mesh, approx.) | 100 |
| Ferrosilicon (200 minus mesh) | 2 |
| Silicate of soda (mol ratio 2; specific gravity 1.3) | 6 |

(2) *Test results*

| Elapsed time after molding to test (hour) | Compression strength (kg./cm.²) | Permeability (AFS) |
|---|---|---|
| 2 | 0.3 | 150 |
| 4 | 1.4 | 160 |
| 25 | 18.0 | 175 |

EXAMPLE 4

(1) *Mixture (parts by weight)*

|  | Parts |
|---|---|
| Silica sand (100 mesh, approx.) | 100 |
| Ferrosilicon (200 minus mesh) | 4 |
| Silicate of soda (mol ratio 2; specific gravity 1.5) | 14 |

(2) *Test results*

| Elapsed time after molding to test (hour) | Compression strength (kg./cm.²) | Permeability (AFS) |
|---|---|---|
| 1 | 20 | 125 |
| 2 | 35 | 135 |
| 4 | 55 | 140 |
| 25 | 90 | 140 |

In the fabrication of a mold by the method of this invention, there arises the need for lengthening or shortening the time interval (hereinafter referred to as the hardening time) elapsing after the mixing of the mixture materials, through the progress of the hardening reaction, to the completion of hardening of the mold. Accordingly, it is preferable that the hardening time be controllable according to necessity.

This hardening time can, of course, be controlled by temperature regulation through such methods as heating or cooling the room and the mixture materials and varying the time during which mixing is carried out and the rotational speed of the mixer, and, in addition, by regulation of the grain size of the substances containing silicon. However, by the hardening time control method according to this invention which consists of one measure selected from among the several measures described in detail below, systematic control of the hardening time can be efficiently accomplished in a precise, infallible manner over a wide range.

1. HARDENING TIME CONTROL THROUGH VARIATION OF TIME FOR MIXING MIXTURE MATERIALS

The hardening time varies somewhat with the kind of silicon material, but, by varying the time for mixing treatment of the mixture materials, the hardening time can be regulated further. As illustrations, experimental examples are indicated in the following Tables 1 and 2.

TABLE 1

(1) *Mixture (parts by weight)*

(A)

|  | Parts |
|---|---|
| Silica sand | 100 |
| Water glass (specific grav. 1.3) | 5 |
| Calcium silicide (300 minus mesh) | 2 |

(B)

|  | Parts |
|---|---|
| Silica sand | 100 |
| Water glass (specific grav. 1.3) | 5 |
| Ferrosilicon (300 minus mesh) | 2 |

(2) *Experimental results (hardening times)*

|  | Min. |
|---|---|
| Mixture (A) | 4 to 10 |
| Mixture (B) | 60 to 240 |

TABLE 2

(1) *Mixture (parts by weight)*

|  | Parts |
|---|---|
| Silica sand | 100 |
| Ferrosilicon powder | 2 |
| Water glass (specific grav. 1.3) | 5 |

(2) *Experimental results*

|  | Hardening time (min.) | | | | |
|---|---|---|---|---|---|
| Air temp. (° C.) | 10 or lower | 12 | 14 | 16 | 20 |
| Mixing time (min.): | | | | | |
| 1 |  | 36.3 | 35.4 | 35.3 | 32.0 |
| 2 | 62.5 | 28.0 | 23.8 | 22.0 | 20.0 |
| 3 | 53.7 | 23.7 | 20.0 | 18.4 | 15.3 |
| 4 | 38.3 | 18.0 | 16.8 | 13.8 |  |
| 5 | 25.6 | 15.2 | 12.4 |  |  |
| 6 |  |  | 10.0 |  |  |

2. HARDENING TIME CONTROL THROUGH VARIATION OF GRAIN SIZE OF SILICON OR SILICON ALLOY

By varying the grain size of the silicon alloy to be used, for example, calcium silicide or ferrosilicon, thereby varying the reaction area, unrelatedly to the mixture ratio, it is possible to control the setting time. As illustrations, experimental examples are indicated in Tables 3 and 4.

TABLE 3

(1) *Mixture (parts by weight)*

|  | Parts |
|---|---|
| Ferrosilicon | 4 |
| Silicate of soda (sp. grav. 1.3) | 10 |

(2) *Experimental results*

| Average grain size of ferrosilicon (microns) | 8.34 | 6.23 | 6.09 | 5.57 | 3.82 |
|---|---|---|---|---|---|
| Reaction time (min.) | 40.0 | 24.0 | 22.0 | 18.0 | 15.0 |

TABLE 4

(1) *Mixture (parts by weight)*

|  | Parts |
|---|---|
| Silica sand (100 mesh, approx.) | 100 |

Ferrosilicon _____ 2
Silicate of soda (sp. grav. 1.3) _____ 5

(2) Experimental results

[⬧LAPSED TIME AFTER MOLDING TO TEST: 24 HOURS]

| Average grain size of ferrosilicon (microns) | Compression strength (kg./cm.²) | Permeability (ASF) |
|---|---|---|
| 8.34 | 25.5 | 200 |
| 6.23 | 25.0 | 195 |
| 6.09 | 26.0 | 181 |
| 5.57 | 25.5 | 183 |
| 3.82 | 24.5 | 196 |

3. HARDENING TIME CONTROL THROUGH SURFACE TREATMENT OF SILICON ALLOY POWDER.

By oxidizing or otherwise changing the nature of the surfaces of the particles of silicon or silicon-containing alloy powder to a suitable depth, by such a method as water injection, exposure to air, exposure to heat, and the use of chemicals, and thereby varying the conditions of reaction with caustic soda, it is possible to control the hardening time. One experimental result is presented below.

(1) Mixture (parts by weight)

| | Parts |
|---|---|
| Silica sand (100 mesh, approx.) | 100 |
| Ferrosilicon (300 minus mesh) | 2 |
| Silicate of soda (mol ratio 2; sp. grav. 1.3) | 5 |

One specimen of the above mixture was prepared with untreated ferrosilicon, and two other specimens were prepared with their ferrosilicon treated as indicated in Table 5, in which the measure reaction times of these specimens are also shown.

TABLE 5

| Treatment of Fe-Si powder | Average grain size of Fe-Si (microns) | Hardening time (min.) |
|---|---|---|
| No treatment | 4.82 | 12 |
| 10% water injected; left for 24 hours | 4.82 | 24 |
| 10% of 3% solution of hydrogen peroxide added; left for 24 hours | 4.82 | 23 |

4. HARDENING TIME CONTROL THROUGH ADDITION OF CAUSTIC SODA TO WATER GLASS

By adding caustic soda to the water glass it is possible to control the hardening time. As an illustration, an experimental example is presented below.

(1) Mixture (parts by weight)

| | Parts |
|---|---|
| Silica sand (100 mesh, approx.) | 100 |
| Silicate of soda (mol ratio 2; sp. grav. 1.3) | 10 |
| Ferrosilicon (200 minus mesh) | 4 |

Several specimens of the above mixture with varying proportions of caustic soda (20% aqueous solution) added to the silicate of soda thereof were prepared, and their hardening times were measured. The measured results are shown in Table 6.

TABLE 6

In the case of ferrosilicon:

| Quantity of caustic soda added to silicate of soda (percent) | Hardening time (min.) |
|---|---|
| 0 | 280 |
| 5 | 140 |
| 10 | 170 |
| 15 | 180 |

5. HARDENING TIME CONTROL THROUGH USE OF SILICATE OF SODA WITH DIFFERING SILICATE-SODA RATIO

It has been found that the reaction speed varies with the silicate-soda ratio ($SiO_2/Na_2O$) of the silicate of soda. By utilizing this relationship and suitably selecting the silicate-soda ratio, it is possible to control the hardening time in an easy manner. As an illustration, an experimental example is presented below.

Three specimens were prepared by mixing, in each case, 4 grams of ferrosilicon (grain size 3.8 microns) with 10 grams of silicate of soda (specific gravity 1.3) which had been adjusted with water, the $SiO_2/Na_2O$ ratios of the silicate of soda in the said three specimens being, respectively, 1, 2, and 3. The result of measuring the time to reach maximum temperature, as an indication of the reaction speed, in the case of each specimen is shown in Table 7.

TABLE 7

| $SiO_2/Na_2O$ ratio of silicate of soda | 1 | 2 | 3 |
|---|---|---|---|
| Time to reach max. temperature (min.) | 13 | 40 | 104 |

6. HARDENING TIME CONTROL THROUGH VARIATIONS OF PROPORTIONS OF MIXTURE OF DIFFERENT SILICA ALLOYS

Since calcium and ferrosilicon respectively have characteristics differing in hardening reaction time, it is possible to regulate the hardening time by suitable blending of these substances. As an illustration, the following experimental examples are presented with results shown in Tables 8 and 9.

TABLE 8

(1) Mixture (parts by weight)

| | Parts |
|---|---|
| Silica sand (100 mesh, approx.) | 100 |
| Mixture of: Ferrosilicon (100 minus mesh), Calcium silicide (100 minus mesh) | 2 |
| Silicate of soda (sp. grav. 1.3) | 5 |

(2) Experimental results

| Mixture proportions of ferrosilicon and calcium silicon (percent) | | Time to attain maximum surface hardness (min.) |
|---|---|---|
| 0 | 100 | 4 |
| 20 | 80 | 5 |
| 40 | 60 | 7 |
| 60 | 40 | 10 |
| 80 | 20 | 20 |
| 100 | 0 | 60 |

TABLE 9

(1) Mixture (same as in Table 8)

(2) Experimental results

| Mixture proportions of ferrosilicon and calcium silicon (percent) | | Compression strength (kg./cm.²) | | |
|---|---|---|---|---|
| | | Elapsed time after molding to test | | |
| | | 30 min. | 69 min. | 120 min. |
| 0 | 100 | 7.2 | 8.4 | 12.8 |
| 20 | 80 | 5.0 | 6.3 | 9.0 |
| 40 | 60 | 3.8 | 5.0 | 7.2 |
| 60 | 40 | 2.8 | 4.0 | 6.5 |
| 80 | 20 | 0.8 | 1.8 | 4.5 |
| 100 | 0 | 0.3 | 0.4 | 3.2 |

7. HARDENING TIME CONTROL THROUGH COMBINATION OF TWO OR MORE MEASURES SELECTED FROM AMONG THE FOREGOING MEASURES 1 THROUGH 6

It is possible to control the hardening time by combining any two or more measures selected from among the foregoing measures 1 through 6, for example, by combining the variation of time for mixing the mixture materials of measure 1 and the variation of grain size of silicon or silicon alloy of measure 2. As an illustration, an experimental example is presented in Table 10.

TABLE 10

(1) *Mixture (parts by weight)*

| | Parts |
|---|---|
| Silica sand (100 mesh, approx.) | 100 |
| Ferrosilicon | 2 |
| Silicate of soda (sp. grav. 1.3) | 5 |

(2) *Mixing machine (kneader)*

| | |
|---|---|
| Rotational speed r.p.m. | 70 |
| Capacity kg./batch | 100 |

(3) *Experimental results*

| Mixing time (min.) | Average grain size of ferrosilicon (micron) | Hardening time (min.) |
|---|---|---|
| 3 | 2.5 | 141 |
| 5 | 2.5 | 105 |
| 3 | 1.77 | 30 |
| 5 | 1.77 | 20 |
| 3 | 1.04 | 25 |
| 5 | 1.04 | 15 |

As described above, a mold produced by the method of this invention, in addition to having high strength, has a low water content from the very beginning, and since this water content is further reduced by decomposition of the water and the drying effect due to heat of reaction, the moisture content after hardening is extremely low. Since this mold further has excellent gas permeability it may be effectively used in the place of conventional green sand molds as well as in applications where dry molds have hitherto been used because green sand molds could not be used, thereby eliminating the drying process step.

Furthermore, by the practice of the method of this invention, it is possible to select conditions of extremely good fluidity of the sand. Accordingly, this invention can be applied to all of the various molding techniques practiced heretofore, that is, to the projecting method, spattering or spraying method and other various molding methods, having an extremely wide range of application.

By the practice of the method of this invention, furthermore, it is possible to control at will the hardening time of the mold according to the necessity, whereby it is possible to select a hardening time which is convenient for the molding.

It is possible, of course, to use suitable quantities of various kinds of additives, for example, cereal flours, dextrins, sawdust or wood flours, carbonaceous substances, and pitch, in the mold in order to provide it with various special properties required thereof as a mold.

Since it is obvious that many changes and modifications can be made in the above described details without departing from the nature and spirit of the invention, it is to be understood that the invention is not to be limited to the details described herein except as set forth in the appended claims.

What is claimed is:

1. A process for manufacturing a self-hardening mold exothermically, which comprises mixing 4 to 14 parts by weight of waterglass and 2 to 4 parts of a finely powdered substance, selected from the group consisting of silicon, calcium silicide, ferrosilicon, and mixtures thereof, into 100 parts silica sand, forming the mixture into a mold, permitting the mold to harden solely by reaction of the sodium silicate with the powdered substance and in the absence of externally applied heat.

2. The process as defined in claim 1, wherein the hardening time of said mold is adjusted by oxidizing the surface of said powdered substance, effected by adding approximately 10 percent by weight of a material selected from the group consisting of water and an aqueous 3 percent hydrogen peroxide solution thereto, said oxidation being effected prior to mixing with the other constituents.

3. The process as defined in claim 1, wherein the hardening time of said mold is adjusted by oxidizing the surface of said powdered substance, effected by heating said substance, said oxidation being effected prior to mixing with the other constituents.

References Cited by the Examiner

UNITED STATES PATENTS

| 1,959,179 | 5/1934 | Snell | 106—38.3 |
| 2,883,723 | 4/1959 | Moore et al. | 22—193 |
| 3,050,796 | 8/1962 | Moore | 22—193 |

FOREIGN PATENTS

| 974,520 | 1/1961 | Germany. |
| 653,587 | 5/1951 | Great Britain. |
| 125,482 | 4/1928 | Switzerland. |
| 138,776 | 5/1930 | Switzerland. |
| 140,720 | 9/1930 | Switzerland. |

MARCUS U. LYONS, *Primary Examiner.*

WILLIAM J. STEPHENSON, *Examiner.*